US007801730B1

(12) United States Patent
Miyazaki et al.

(10) Patent No.: US 7,801,730 B1
(45) Date of Patent: Sep. 21, 2010

(54) VOICE RECOGNITION CONTROL SYSTEM AND VOICE RECOGNITION CONTROL METHOD

(75) Inventors: Yoshio Miyazaki, Kanagawa (JP); Tamiya Tanaka, Kanagwa (JP); Shizue Murayama, Kanagawa (JP); Kazuhisa Seita, Kanagawa (JP); Kenji Kaneko, Saitama (JP)

(73) Assignee: Sony Corporation, Tokyo (JP)

( * ) Notice: Subject to any disclaimer, the term of this patent is extended or adjusted under 35 U.S.C. 154(b) by 2797 days.

(21) Appl. No.: 09/626,309

(22) Filed: Jul. 26, 2000

(30) Foreign Application Priority Data

Jul. 27, 1999 (JP) ................................ 11-212556

(51) Int. Cl.
*G10L 21/00* (2006.01)

(52) U.S. Cl. ..................................... 704/275

(58) Field of Classification Search .................. 704/270, 704/275, 200, 231, 270.1; 340/825.25
See application file for complete search history.

(56) References Cited

U.S. PATENT DOCUMENTS

| 5,909,183 | A | * | 6/1999 | Borgstahl et al. | ...... | 340/825.22 |
| 6,119,088 | A | * | 9/2000 | Ciluffo | ........................ | 704/275 |
| 6,535,854 | B2 | * | 3/2003 | Buchner et al. | ............. | 704/275 |
| 6,584,439 | B1 | * | 6/2003 | Geilhufe et al. | ............. | 704/270 |
| 6,615,177 | B1 | * | 9/2003 | Rapp et al. | ................... | 704/277 |

FOREIGN PATENT DOCUMENTS

| EP | 0911808 | 8/2002 |
| JP | 05-007385 | 1/1993 |
| JP | 08-305391 | 11/1996 |
| JP | 2001-005489 | 12/2001 |

* cited by examiner

*Primary Examiner*—Angela A Armstrong
(74) *Attorney, Agent, or Firm*—Finnegan, Henderson, Farabow, Garrett & Dunner, L.L.P.

(57) ABSTRACT

A voice recognition control system capable of realizing control of entire voice-recognizable electronic devices through voice recognition. This control system includes a voice input unit for inputting an operator's voice, a voice recognition unit and a controller constituting a control means which recognizes the operator's voice obtained from the voice input unit and controls input/output of an MD player having a voice recognition table where the operator's voice is stored in advance as an expected value. When an unregistered MD player has been connected first, the voice recognition unit registers the voice recognition table provided from the MD player. And upon input of the operator's voice by the voice input unit, the control means compares the operator's voice with the preregistered voice recognition table, and then the controller controls the input/output of the MD player in accordance with the result of comparing the operator's voice with the voice recognition table.

11 Claims, 10 Drawing Sheets

VOICE RECOGNITION CONTROL SYSTEM AND VOICE RECOGNITION CONTROL METHOD

BACKGROUND OF THE INVENTION

The present invention relates to a voice recognition control system and a voice recognition control method adapted for controlling input/output of an electronic device by a voice uttered from an operator.

More particularly, the present invention is equipped with a control means which compares an input operator's voice with a registered voice recognition table and controls the input/output of an electronic device in accordance with the result of such comparison, wherein the voice recognition table of the electronic device is registered upon connection of the electronic device to the control means, so that the input/output of the electronic device can be controlled through voice recognition with regard to each of the voice-recognizable electronic devices.

A variety of electronic devices are currently being developed and diffused with the recent technological progress. In order to realize simplified and comfortable use of such electronic devices, urgent development is now in rapid advance to enhance the operability, and the development is expedited with respect to, for example, the voice recognition control system and so forth which operate electronic devices through voice recognition. The voice recognition control system serves to operate a desired electronic device in accordance with a voice uttered from an operator, and is capable of performing more simplified and comfortable operation of the electronic device in comparison with the known manual operation.

In executing such control, it is necessary that any connected voice-recognizable electronic device be recognized by the voice recognition control system so that this system can execute exact control through voice recognition. For example, an input voice is converted by the voice recognition control system into a unique control command corresponding to the recognized electronic device, and then the control command is outputted to the electronic device to control the same.

An example utilizing such a voice recognition control system mentioned above is an automobile voice recognition control system. Known electronic devices for automobile use include compact disc (CD) player and mini disc (MD) player adapted for voice recognition, and also car navigation system (car navigator) based on the global positioning system. Due to control of such devices through voice recognition, it becomes possible, even during driving, to achieve easy operation thereof without impairing the safety.

According to the conventional voice recognition control system, in an exemplary case where voice-recognizable CD players, MD players and car navigators are connected to a voice recognition system and such electronic devices are to be operated through voice recognition, some voice-recognizable CD players, MD players and car navigators are registered in advance by the voice recognition control system, and a bus (communication line), to which each of the registered CD players, MD players and car navigators is connected, is determined previously. That is, exclusive recognition is performed by the use of an exclusive bus.

Therefore, by connection of the preregistered CD player, MD player and car navigator to an exclusive bus, the input/output thereof can be controlled through voice recognition.

However, according to the conventional voice recognition control system, each of the entire voice-recognizable electronic devices registered previously in the voice recognition control system is recognized upon connection thereof to an exclusive bus, whereby control is performed through voice recognition.

Therefore, when any unregistered electronic device (e.g., new-model electronic device or one made by some other company) adapted for voice recognition has been connected, this device fails to be recognized since there exists merely the control information for the registered electronic devices alone. Consequently, even if the electronic devices are those adapted for voice recognition, there arise some problems including that the procedure for registration is complicated and, as the contents of registration are different depending on the type of each device, it is impossible to perform proper control thereof through voice recognition.

SUMMARY OF THE INVENTION

The present invention has been accomplished for the purpose of solving the above-described problems with improvements in the method of recognizing electronic devices connected to the control system. And it is an object of the present invention to provide a voice recognition control system and a voice recognition control method capable of controlling the entire voice-recognizable electronic devices through voice recognition.

According to one aspect of the present invention, there is provided a voice recognition control system which controls the input/output of each electronic device having a prerecorded voice recognition table where an operator's voice is stored in advance as an expected value. The control system includes a voice input means for inputting the operator's voice, and a control means for controlling the input/output of the electronic device through recognition of the operator's voice inputted by the voice input means. When any unregistered electronic device has been connected to the control means, the control means registers a voice recognition table provided by the electronic device, and when the operator's voice has been inputted by the voice input means, the control means compares the operator's voice with the voice recognition table of the preregistered electronic device, and then controls the input/output of the electronic device in accordance with the result of comparing the operator's voice with the voice recognition table.

In the present invention, upon connection of any unregistered electronic device to the control means, the voice recognition table of the electronic device is registered by the control means, and the operator's voice inputted by the voice input means is recognized by the control means. Subsequently the operator's voice is compared with the registered voice recognition table by the control means, and the input/output of the electronic device is controlled in accordance with the result of such comparison, so that even when any unregistered voice-recognizable electronic device is connected, the electronic device can still be operated in response to the operator's voice.

According to another aspect of the present invention, there is provided a voice recognition control method employed in a voice recognition control system which recognizes an operator's voice and controls the input/output of each electronic device from a control section. The control method includes the steps of supplying, to each electronic device, a voice recognition table where the operator's voice is stored in advance as an expected value, then registering the voice recognition table of the electronic device in the control section when any unregistered electronic device supplied with the voice recognition table has been connected to the control section, subsequently, upon input of the operator's voice, comparing the operator's voice with the voice recognition table of the electronic device registered in the control section, and controlling the input/output of the electronic device in accordance with the result of comparing the operator's voice with the voice recognition table.

In the voice recognition control method of the present invention, when unregistered various electronic devices supplied respectively with voice recognition tables have been connected to the control section, the various voice recognition tables are registered respectively in the control section, so that the input/output of each electronic device can be controlled in response to the operator's voice.

Thus, the voice recognition control system and method are capable of controlling the entire voice-recognizable electronic devices through voice recognition.

The above and other features and advantages of the present invention will become apparent from the following description which will be given with reference to the illustrative accompanying drawings.

DESCRIPTION OF THE PREFERRED EMBODIMENTS

Hereinafter an explanation will be given on a preferred embodiment which represents a voice recognition control system of the present invention. In this embodiment, a control means is included for comparing an input operator's voice with a registered voice recognition table and controlling input/output of an electronic device in accordance with the result of such comparison. And upon connection of the electronic device to the control means, the voice recognition table of the electronic device is registered, so that the input/output of each of the entire voice-recognizable electronic devices can be controlled through voice recognition. It is premised here that an MD player is used as an unregistered electronic device having a voice recognition table.

Figure 1:
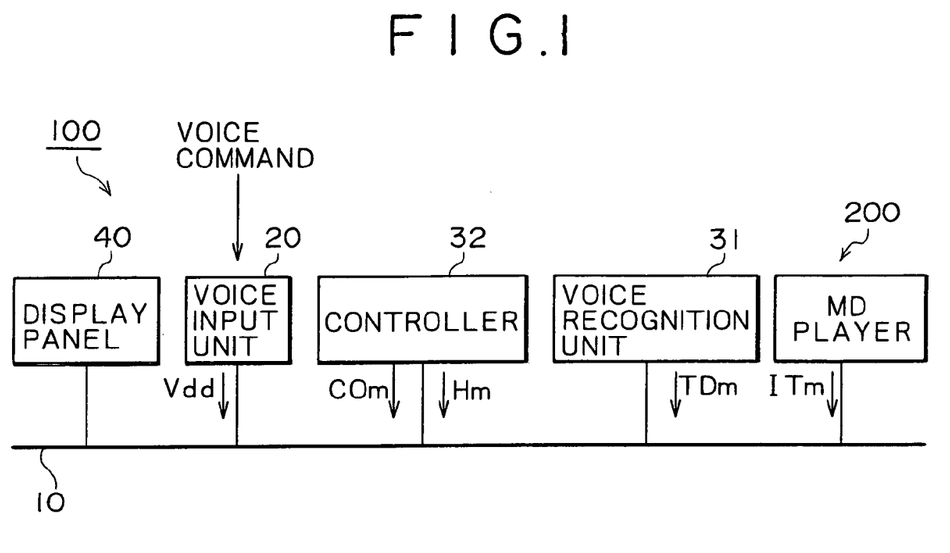
FIG. 1 is a block diagram showing a structural example of a voice recognition control system as an embodiment of the present invention.

FIG. 1 is a block diagram showing a structural example of a voice recognition control system 100 as an embodiment of the present invention. A voice input unit 20 serving as a voice input means in FIG. 1 has, although not shown, a microphone for inputting a voice, a microphone amplifier for amplifying the input voice, and an A-D converter for converting the input analog signal into a digital signal. The voice input unit 20 first inputs a command composed of an operator's voice (hereinafter referred to as voice command), then converts the input voice command (voice analog data) into voice digital data Vdd (isochronous data) suited for transfer of video and audio signals which are transmitted or received in the form of a packet of a fixed quantity per 125 μsec, and outputs the voice digital data Vdd thus obtained.

The voice input unit 20 is connected to a communication line such as, for example, an IEEE1394 bus 10. Various devices are connected to the IEEE1394 bus 10 to thereby construct a local area network. This IEEE1394 bus 10 serves as a high-performance serial bus interface conforming with the IEEE1394 standard and is adapted to be used for transfer of isochronous data and so forth. To the IEEE1394 bus 10, there is connected an unregistered MD player 200 having a voice recognition table ITm where the voice digital data Vdd, which is obtained by digitizing the voice command uttered from an operator, is stored as an expected value. This voice recognition table ITm has, as an expected value, a voice command "MD" indicative of the MD player 200.

To the IEEE1394 bus 10, there are also connected a voice recognition unit 31, a controller 32 and so forth which constitute a control means. The voice recognition unit 31 registers the voice recognition table ITm of the electronic device and inputs, via the IEEE1394 bus 10, the voice digital data Vdd outputted from the voice input 20. When merely one registered voice recognition table is existent, the voice recognition unit 31 compares the input voice digital data Vdd with the registered voice recognition table ITm and then executes a voice recognition routine to recognize the voice digital data Vdd.

In this case, if the voice digital data Vdd coincides with the expected value in the voice recognition table ITm, the voice digital data Vdd is converted into voice text data TDm, which is asynchronous data, by the use of the compared voice recognition table ITm, and subsequently the voice text data TDm is transferred to the controller 32 via the IEEE1394 bus 10. The voice text data TDm is used by the controller 32 to perform its control action in accordance with the voice uttered from the operator.

When the voice recognition unit 31 has a plurality of registered voice recognition tables which are not shown here, the voice recognition unit 31 compares the input voice digital data Vdd with each of the entire registered voice recognition tables and executes the voice recognition routine. If the voice digital data Vdd coincides with the expected value in a voice recognition table ITx for example, the voice digital data Vdd is converted into voice text data TDx or the like on the basis of the voice recognition table ITx. In case the voice recognition unit 31 has a plurality of registered voice recognition tables, a detection is made as to whether there is any duplicate expected value or not with regard to the same voice command (voice digital data Vdd), and the result of such a detection is displayed on a display panel 40 or the like connected to the IEEE1394 bus 10. This display panel 40 will be described later with reference to FIG. 2. The voice input unit 20, the IEEE1394 bus 10 and the voice recognition unit 31 are not limited to those mentioned above, and may be replaced with any other equivalent ones having the same functions.

The controller 32 consists of a CPU (central processing unit) or the like, and recognizes that the MD player 200 having a voice recognition table ITm is connected to the IEEE1394 bus 10. This recognition of the connection is performed by acquiring information relative to the node (connected device) through the process of three phases, i.e., a bus initialize phase, a tree identify phase and a self identify phase. In the bus initialize phase, the bus is reset in response to switching on the connected node, and the entire information relative to the configuration of node connection is completely erased.

In the tree identification, the nodes connected individually via a route of the controller 32 are so identified as to be handlable as a tree-structure connection. And in the self identification, unique self node ID are set respectively by notifying the other nodes of self ID packets where the self node ID are set in order from a leaf node at the end of the tree. Upon recognition of connection of the MD player 200, the controller 32 gives a transfer permission in response to a bus arbitration which is sent from the MD player 200 for requesting a permission to transfer the self voice recognition table ITm to the voice recognition unit 31. In this stage, the arbitration is executed in an asynchronous transfer mode (ATM).

When the operator's voice command received by the voice input unit 20 is a command indicating the name of the electronic device to be used, such as "MD" indicative of the MD player 200, voice text data TDm having the content to indicate the MD player 200 is transferred to the controller 32 from the voice recognition unit 31 which has processed the voice command "MD" through voice recognition, and then the controller 32 outputs to the voice recognition unit 31 a device notice signal Hm produced on the basis of the voice text data TDm. This device notice signal Hm notifies the voice recognition unit 31 to use the voice recognition table ITm of the registered MD player 200 in the subsequent process of voice recognition.

When the operator's voice command received by the voice input unit 20 is a command such as "play" to operate the MD player 200, voice text data TDm having the content to indicate the "play" mode of the MD player 200 is transferred to the controller 32 from the voice recognition unit 31 which has processed the voice command "play" through voice recognition, and then the controller 32 outputs to the voice recognition unit 31 a control command COm produced on the basis of the voice text data TDm. This control command COm serves to control input/output of the MD player 200. In this example, the command COm controls the MD player 200 to operate in a "play" mode.

It is to be understood here that the controller 32 is not limited to the above example alone, and it may be replaced with any equivalent one having the same function. The voice recognition unit 31 is connected solely on the IEEE1394 bus, but it may be incorporated in the controller 32 or the MD player 200 as well. Further, the voice input unit 20 may be connected to the voice recognition unit 31, the controller 32 or the MD player 200 instead of being connected solely on the IEEE1394 bus. Although the display panel 40 is connected solely on the IEEE1394 bus, it may be connected to the controller 32 or the like.

Figure 2:
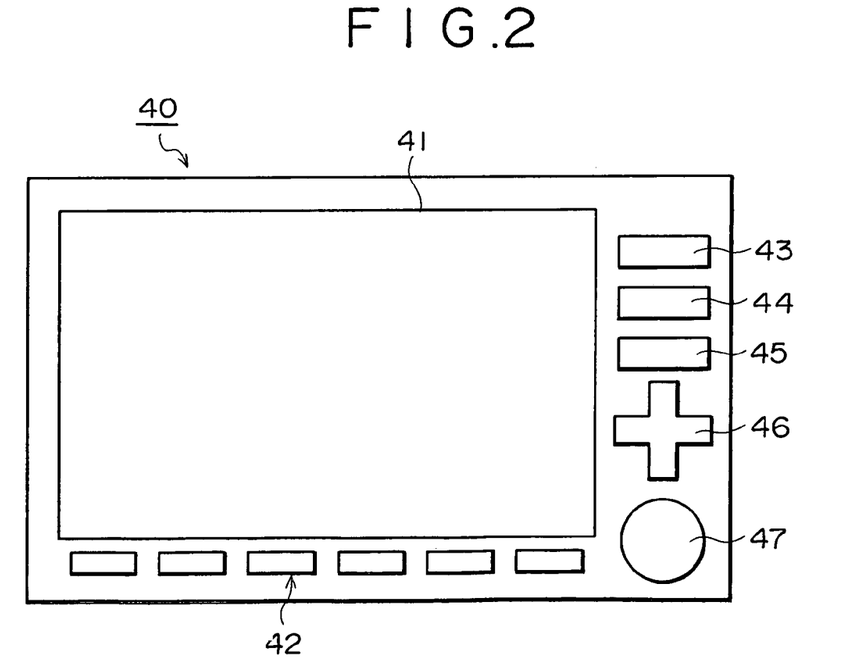
FIG. 2 is a plan view showing a structural example of a display panel.

FIG. 2 is a plan view showing a structural example of a display panel 40 in the voice recognition control system 100. On a display screen 41 and so forth shown in FIG. 2, there are displayed the operation state and various information of the system. A plurality of setting buttons 42 are provided under the display screen 41, and a decision button 43, a start button 44, a stop button 45, a cross button 46, a volume switch 47 and so forth are provided on the right of the display screen 41 in this order downward. For example, a desired display image can be selected by depressing the decision button 43 after manipulating, e.g., the cross button 44 to move a cursor, which is displayed on the screen, to a desired position. The display panel 40 is not limited to this example alone, and may be replaced with any equivalent one having the same function.

"Warning" is displayed on the screen 41 if the voice recognition unit 31 shown in FIG. 1 has detected that duplicate expected values are present with regard to the same voice command (voice digital data Vdd), and there is also displayed a selection processing procedure for selecting one expected value to be used out of such duplicate expected values, or a reregistration processing procedure for reregistering another expected value (voice) as a duplicate one. A selection picture P with such a selection processing procedure is displayed when the voice recognition unit 31 has detected the presence of any duplicate expected value in response to input of the voice digital data Vdd.

A reregistration picture Q with such a reregistration processing procedure is displayed when the voice recognition unit 31 has detected the presence of any duplicate expected value upon registration of the voice recognition table ITm. The selection picture P and the reregistration picture Q can be obtained by either manual input or voice input. Hereinafter an explanation will be given on the selection picture P with reference to FIG. 3 and also on the reregistration pictures Q1-Q5 with reference to FIGS. 4 to 8.

Figure 3:
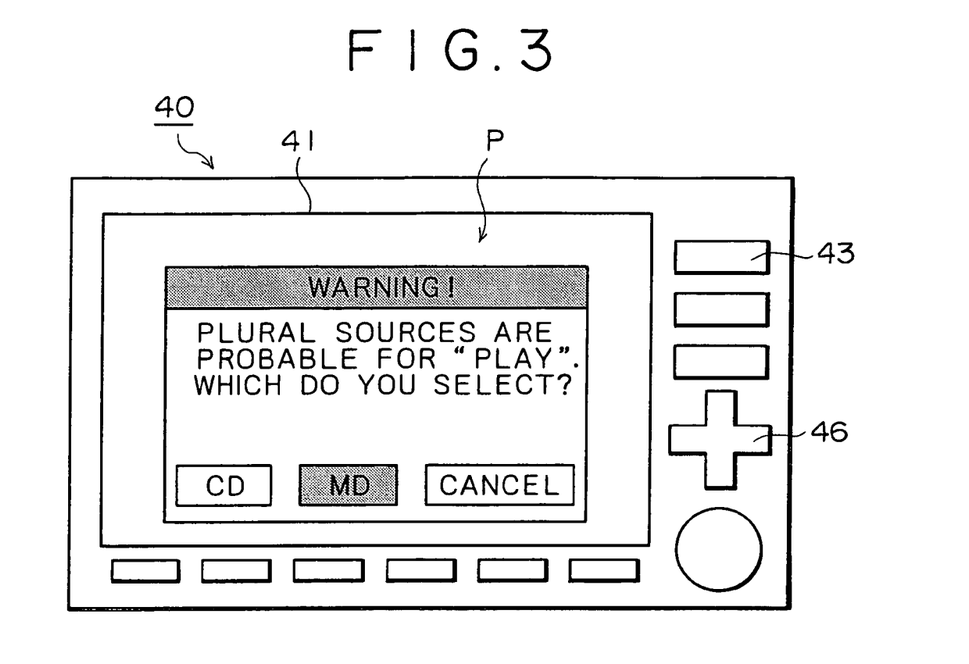
FIG. 3 is an image diagram illustrating a display example of a selection picture P.

FIG. 3 is an image diagram illustrating a display example of the selection picture P. It is premised here that an MD player, a CD player and a car navigator are connected. As shown in FIG. 3, "Warning!" is displayed in an upper portion of the selection picture P on the display screen 41. And there is displayed, under "Warning!", "Plural sources are probable for "Play". Which do you select?". Further, there are displayed "CD", "MD" and "Cancel" in lower portions of the screen 41. These "CD", "MD" and "Cancel" are displayed as commands to be selected by the operator, and any of such commands can be selected through voice recognition or by manipulation of the decision button 43 and the cross button 46. The background of any selected one is reversed in display.

Figure 4:
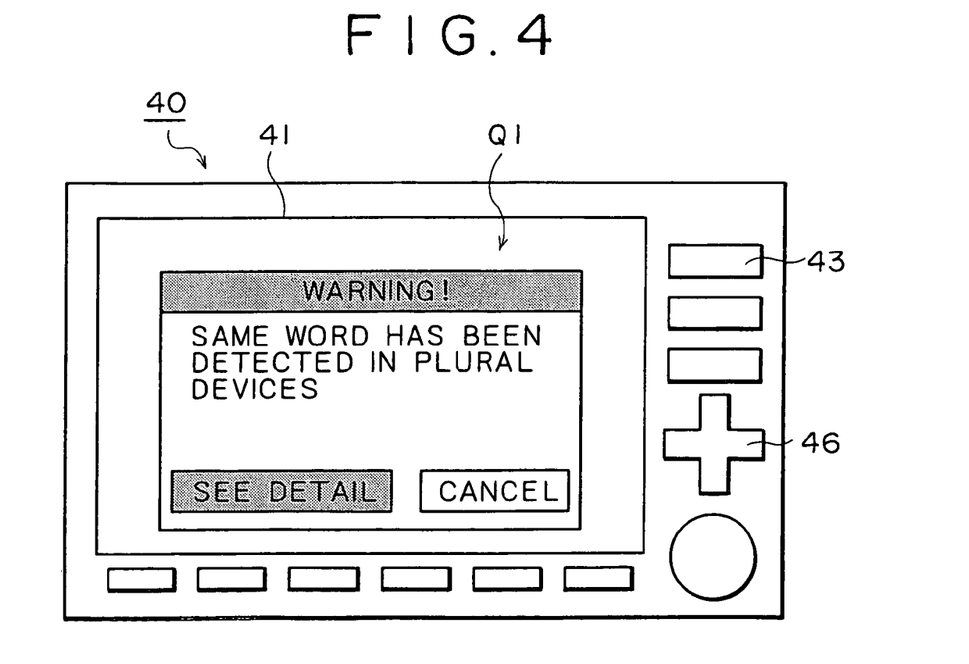
FIG. 4 is an image diagram illustrating a display example of a reregistration picture Q1.

FIGS. 4 to 8 are image diagrams illustrating display examples of reregistration pictures Q1 to Q5 respectively. As shown in FIG. 4, "Warning!" is displayed in an upper portion of the reregistration picture Q1 on the display screen 41. And there is displayed, under "Warning!", "Same word has been detected in plural devices." Further, "See detail" and "Cancel" are displayed as commands thereunder. Such "See detail" and "Cancel" can be selected through voice recognition or by manipulation of the decision button 43 and the cross button 46. The background of any selected one is reversed in display.

Figure 5:
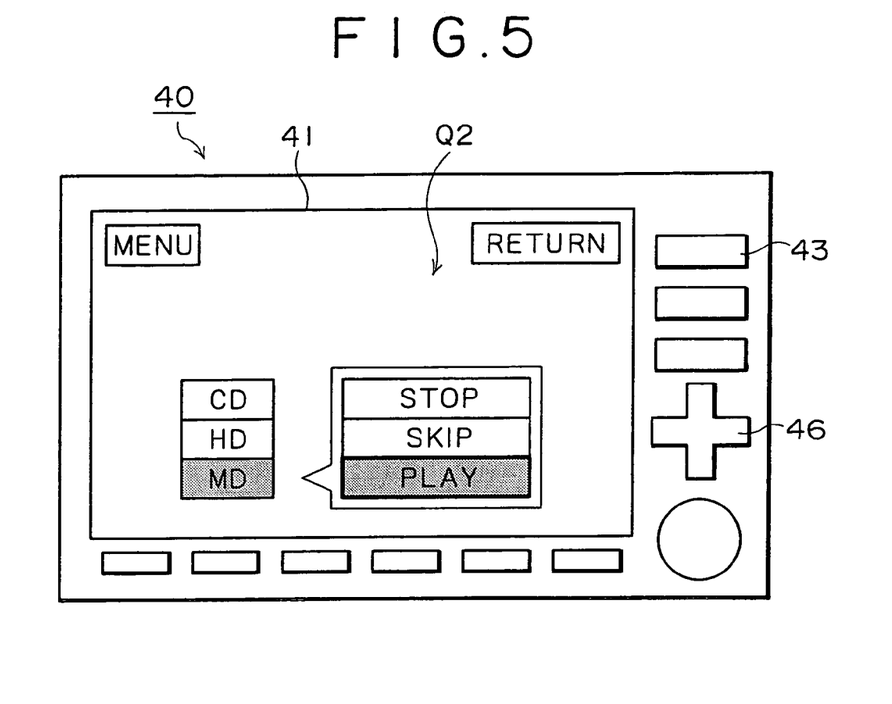
FIG. 5 is an image diagram illustrating a display example of a reregistration picture Q2.

The reregistration picture Q2 shown in FIG. 5 is displayed on the display screen 41 in response to selection of "See detail" in the reregistration picture Q1. "MENU" and "Return" are displayed as commands respectively in an upper left portion and an upper right portion of the reregistration picture Q2. And under "MENU", there are shown "CD", "HD" and "MD" as commands in this order downward. These indicate that some duplicate words are present in "CD", "HD" and "MD". Here, HD denotes a hard disk (not shown) in the car navigator.

When "MD" for example is selected out of "CD", "HD" and "MD" displayed as commands and its background is reversed, then information relative to "MD" is displayed on the right as, for example, "Stop", "Skip" and "Play" in this order downward. These "Stop", "Skip" and "Play" signify, in regard of "MD", to be duplicate with other devices ("CD" and "HD").

Figure 6:
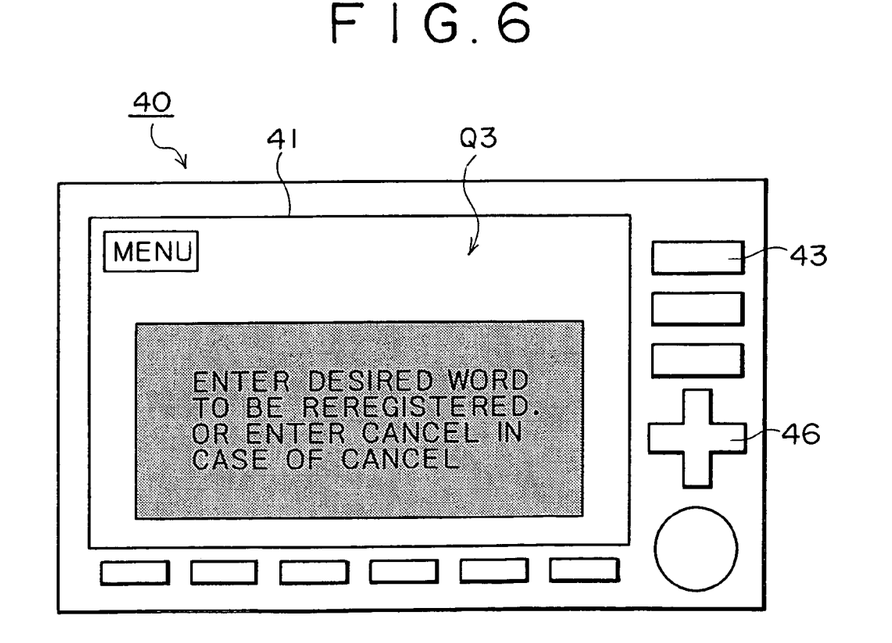
FIG. 6 is an image diagram illustrating a display example of a reregistration picture Q3.

The reregistration picture Q3 shown in FIG. 6 is displayed in response to selection of the word to be reregistered in the registration picture Q2. "MENU" is displayed as a command in an upper left portion of the reregistration picture Q3. And in the vicinity of the picture center, there is displayed an instruction which goes "Enter word to be reregistered. Or enter cancel in case of cancel." In this stage, the content of the displayed instruction may be vocally announced, in addition to such display, by reading or the like through voice synthesis.

Figure 7:
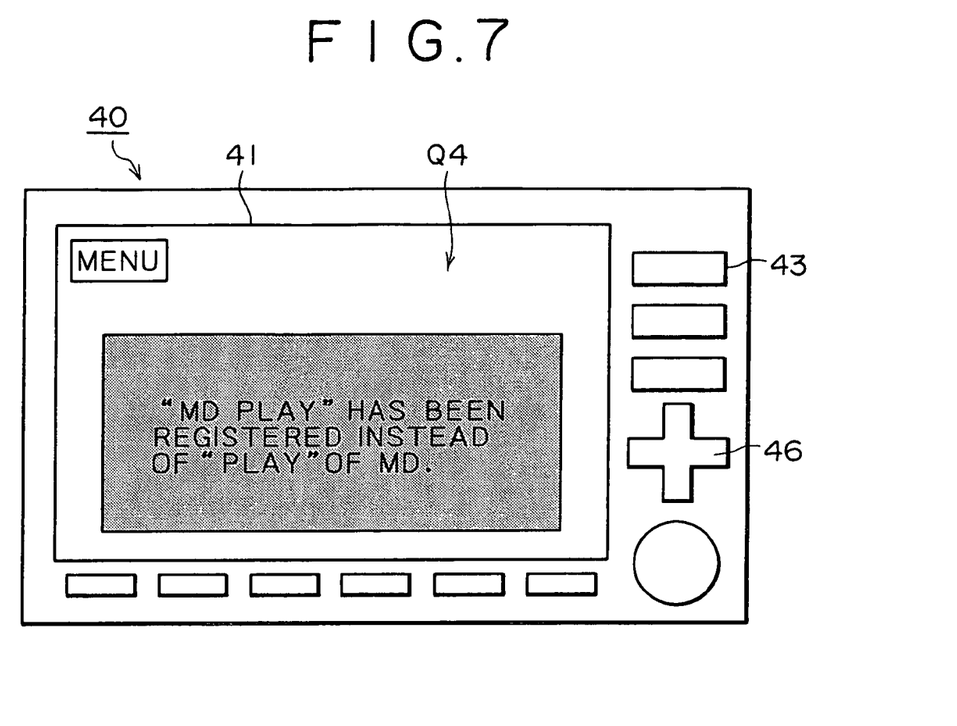
FIG. 7 is an image diagram illustrating a display example of a reregistration picture Q4.

The reregistration picture Q4 shown in FIG. 7 is displayed in response to a voice command which inputs the word to be reregistered in the reregistration picture Q3. "MENU" is displayed as a command in an upper left portion. And in the vicinity of the picture center, there is displayed a message which signifies completion of the reregistration after "MD Play" for example is inputted in the reregistration picture Q3, i.e., "MD Play" has been registered instead of "Play" of MD." In this stage, the displayed processing result may be vocally announced, in addition to such display, by reading or the like through voice synthesis.

Figure 8:
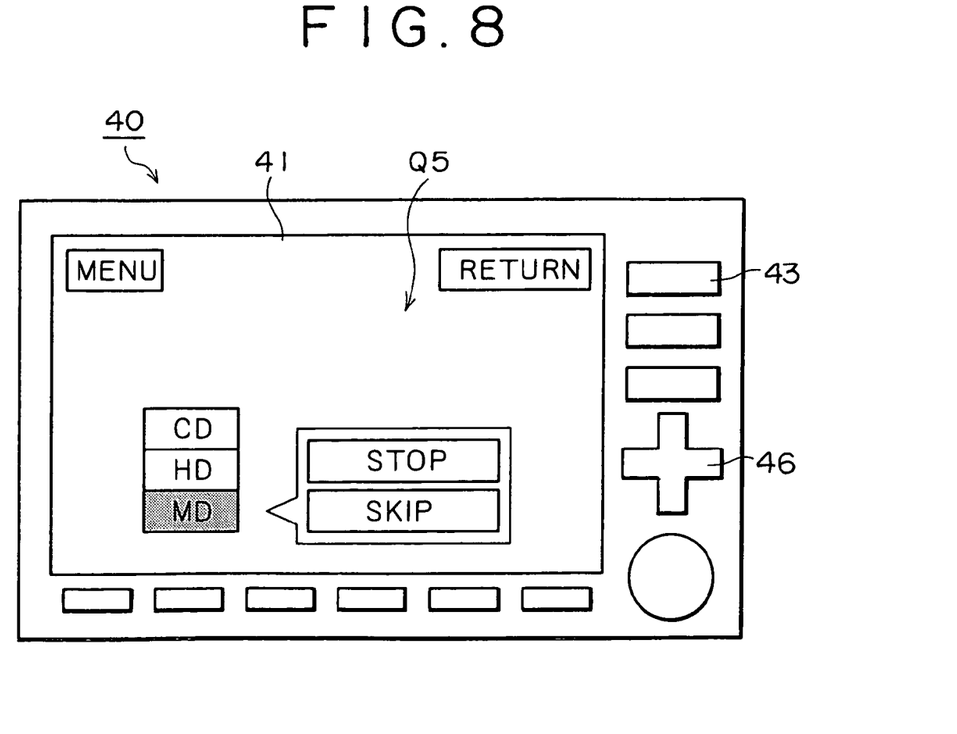
FIG. 8 is an image diagram illustrating a display example of a reregistration picture Q5.

The reregistration picture Q5 shown in FIG. 8 is displayed when there is any other word necessary to be reregistered after display of the reregistration picture Q4. In the reregistration picture Q7 thus displayed, for example the command "Play" completed already for reregistration is excluded. Since merely those not reregistered yet are displayed in this manner, the operator is enabled subsequently to select desired words for sequential registration out of the entire displayed words and to reregister the selected words.

Next, an explanation will be given on a voice recognition control method as a preferred embodiment of the present invention. Here, the explanation will be made separately for one case of single connection where a single electronic device is connected and for another case of multiple connection where multiple electronic devices are connected.

a. Voice Recognition Control in Single Connection

Figure 9:
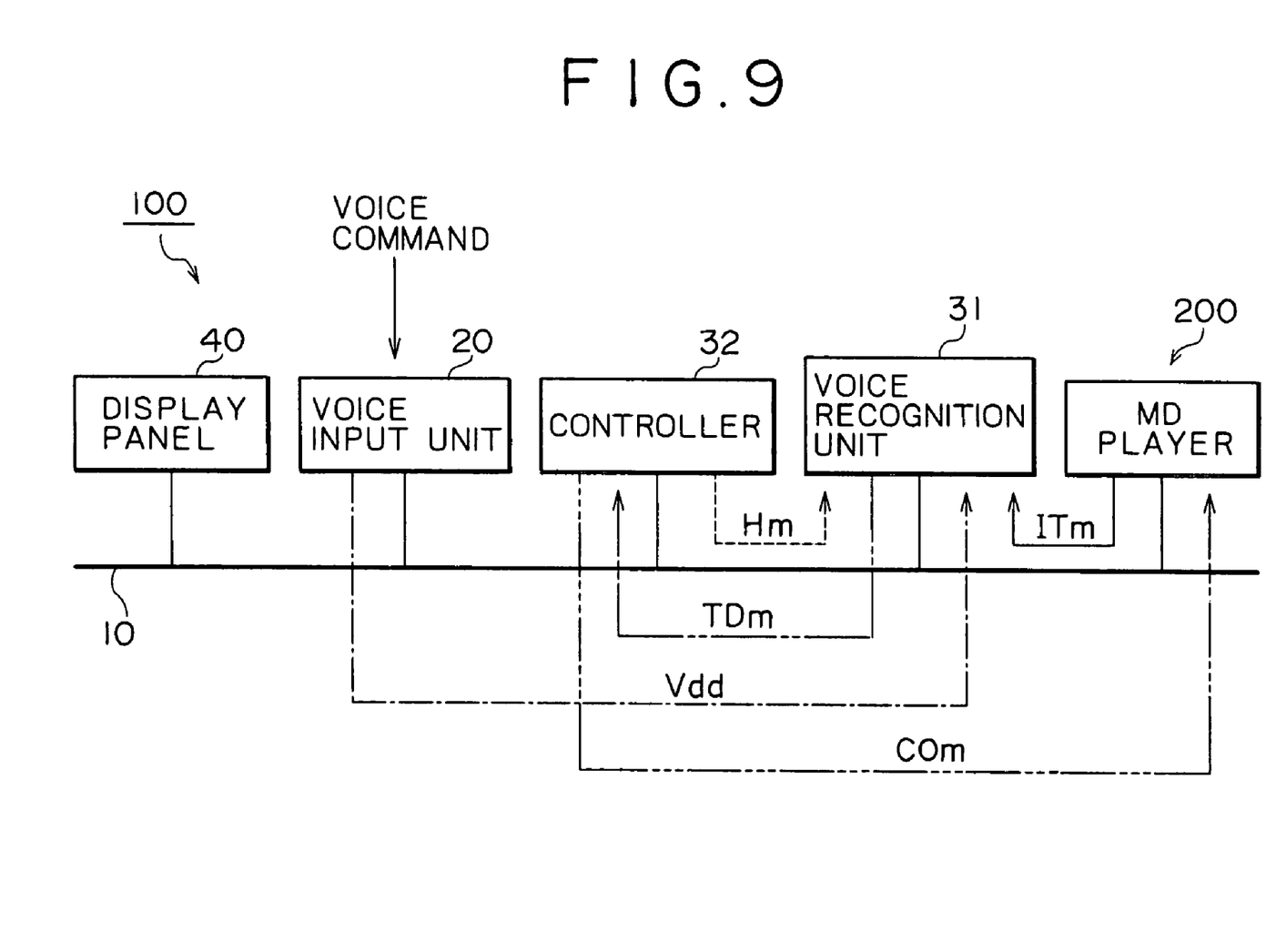
FIG. 9 is a block diagram showing an operation example (single connection) of the voice recognition control system.

FIG. 9 is a block diagram showing an operation example (single connection) of a voice recognition control system 100. It is premised here that an electronic device to be connected is an unregistered MD player 200 having a voice recognition table ITm.

When the MD player 200 has been connected to an IEEE1394 bus 10 as shown in FIG. 9, a controller 32 initializes the bus to thereby erase all the information relative to the connected configuration of the system. Then the controller 32 performs tree identification so that the connected configuration is identified to be handlable as a tree. Thereafter the controller 32 performs self identification to set self node ID, thereby recognizing that the MD player 200 has been connected to the IEEE1394 bus 10.

Subsequently, the MD player 200 thus recognized to have been connected executes an arbitration to the controller 32 for requesting a permission to transfer the voice recognition table ITm to a voice recognition unit 31. Upon permission of such transfer by the controller 32 in response to the arbitration, the MD player 200 transfers the self voice recognition table ITm to the voice recognition unit 31. And then the voice recognition unit 31 registers the voice recognition table ITm thus transferred, whereby the MD player 200 newly connected is registered in the voice recognition control system 100.

When an operator (not shown) controls, through voice recognition, the MD player 200 connected to the voice recognition control system 100, the operator utters, for example, a voice command "Play". Then this voice command is received by a voice input unit 20. Thereafter the voice input unit 20 converts the input voice command into voice digital data Vdd and sends the same to a voice recognition unit 31 via the IEEE1394 bus 10.

The voice recognition unit 31 having thus received the voice digital data Vdd executes a voice recognition process by comparing the voice digital data Vdd with the preregistered voice recognition table ITm and, if the voice digital data Vdd ("Play") coincides with the expected value in the voice recognition table ITm, the voice recognition unit 31 converts the voice digital data Vdd ("Play") into voice text data TDm by use of the voice recognition table ITm, and then transfers the voice text data TDm to the controller 32 via the IEEE1394 bus 10.

The controller 32 generates a control command COm to operate the MD player 200 in a "play" mode in accordance with the transferred voice text data TDm, and then transfers the control command COm to the MD player 200. In response to this control command COm, the MD player 200 performs its "play" operation in compliance with the voice command uttered from the operator.

Thus, when the unregistered MD player 200 having a voice recognition table ITm has been connected to the IEEE1394 bus 10, the voice recognition unit 31 registers the voice recognition table ITm, so that the MD player 200 not registered before can be recognized by the voice recognition unit 31, which is therefore enabled to realize a desired operation of the MD player 200 in response to the voice command.

b. Voice Recognition Control in Multiple Connection

Figure 10:
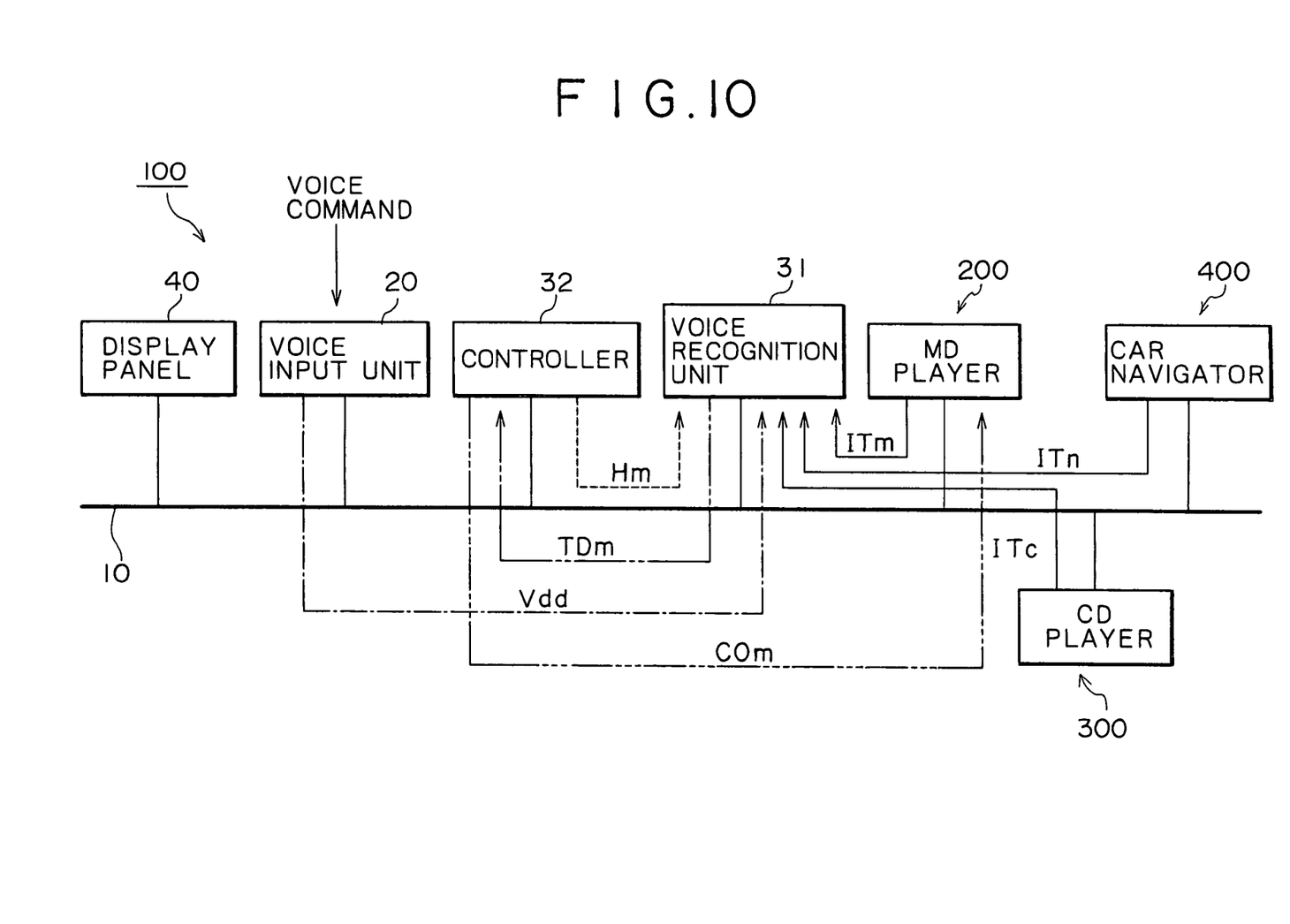
FIG. 10 is a block diagram showing another operation example (multiple connection) of the voice recognition control system.

FIG. 10 is a block diagram showing an operation example (multiple connection) of a voice recognition control system 100. It is premised here that an unregistered CD player 300 having a voice recognition table ITc and an unregistered car navigator 400 having a voice recognition table ITn are additionally connected to an IEEE1394 bus 10 to which an MD player 200 having a voice recognition table ITm is connected in advance.

When the CD player 300 and the car navigator 400 have additionally been connected to the IEEE1394 bus 10 to which the MD player 200 is connected in advance as shown in FIG. 10, all the preceding connected configuration is once erased entirely through initialization of the bus in a connection recognition process executed by a controller 32. Then the new connection of the MD player 200, the CD player 300 and the car navigator 400 is recognized by the controller 32. Thereafter the MD player 200, the CD player 300 and the car navigator 400 perform arbitration and then transfer the voice recognition table ITm of the MD player 200, the voice recognition table ITc of the CD player 300 and the voice recognition table ITn of the car navigator 400, respectively, to a voice recognition unit 31. Subsequently the voice recognition unit 31 registers the voice recognition tables ITm, ITc and ITn transferred thereto, hence registering the MD player 200, the CD player 300 and the car navigator 400 in the voice recognition control system 100.

When the operator controls, through voice recognition, the MD player 200, the CD player 300 and the car navigator 400 connected to the voice recognition control system 100, first the operator utters, for example, a voice command "MD" indicative of the MD player 200 in the case of playing an MD (not shown) loaded as a recording medium in the MD player 200. Then this voice command is received by a voice input unit 20. Thereafter the voice input unit 20 converts the input voice command into voice digital data Vdd and sends the same to a voice recognition unit 31 via the IEEE1394 bus 10.

The voice recognition unit 31 having thus received the voice digital data Vdd executes a voice recognition process by comparing the voice digital data Vdd with the preregistered voice recognition tables ITm, ITc and ITn. Since the voice recognition table ITm has, as an expected value, the voice digital data Vdd ("MD") indicating the name of the MD player 200, the voice recognition unit 31 converts the voice digital data Vdd ("MD") into voice text data TDm ("MD") by use of the voice recognition table ITm, and then transfers the voice text data TDm to the controller 32 via the IEEE139.4 bus 10.

The controller 32 generates a device notice signal Hm in accordance with the voice text data TDm transferred thereto. Then the controller 32 sends this device notice signal Hm to the voice recognition unit 31, which is thereby notified to use the voice recognition table ITm of the MD player 200 for executing subsequent voice recognition. Thereafter, if the operator utters a voice command "Play" for example, this voice command is received by the voice input unit 20. Then the voice input unit 20 converts the received voice command into voice digital data Vdd and outputs the same to the voice recognition unit 31 via the IEEE1394 bus 10.

The voice recognition unit 31 having received the voice digital data Vdd executes a voice recognition process by comparing the voice digital data Vdd with the standby voice recognition table ITm. And if the voice digital data Vdd ("Play") coincides with the expected value in the voice recognition table ITm, the voice recognition unit 31 converts the voice digital data Vdd ("Play") into voice text data TDm by use of the voice recognition table ITm, and then transfers the voice text data TDm to the controller 32 via the IEEE1394 bus 10.

The controller 32 generates a control command COm to operate the MD player 200 in a "play" mode in accordance with the transferred voice text data TDm, and then transfers the control command COm to the MD player 200. In response to this control command COm, the MD player 200 performs its "play" operation in compliance with the voice command uttered from the operator.

Similarly, although not shown, a device notice signal Hc is outputted from the controller 32 in response to input of a voice command "CD", thereby placing the voice recognition table ITc of the CD player 300 in a standby state. And when a voice command "Play" is inputted, the controller 32 generates a control command COc in accordance with voice text data TDc obtained by converting the voice digital data Vdd ("Play") by use of the voice recognition table ITc. And the CD player 300 performs its "play" operation in compliance with the control command COc.

Also similarly to the above, although not shown, a device notice signal Hn is outputted from the controller 32 in response to input of a voice command "Car Navi", thereby placing the voice recognition table ITn of the car navigator 400 in a standby state. And when a voice command "Play" is inputted, the controller 32 generates a control command COn in accordance with voice text data TDn obtained by converting the voice digital data Vdd ("Play") by use of the voice recognition table ITn. And the car navigator 400 performs its "play" operation in compliance with the control command COn.

Thus, even in case such unregistered CD player 300 and car navigator 400 have additionally been connected to the IEEE1394 bus 10 to which the MD player 200 is connected in advance, it is possible for the voice recognition unit 31 to automatically identify the voice recognition table ITm of the MD player 200, the voice recognition table ITc of the CD player 300 and the voice recognition table ITn of the car navigator 400. Therefore, any of the MD player 200, the CD player 300 and the car navigator 400 can be operated in response to the operator's voice command.

Suppose now that expected values are duplicate in a plurality of connected electronic devices, i.e., all the registered voice recognition tables ITm, ITc and ITn thereof have a voice command "Play" respectively as an expected value. Hereinafter an explanation will be given separately on each of the following cases with regard to voice non-recognition caused due to a failure in deciding which of the voice recognition tables is to be selected for conversion of the input voice when merely the voice "Play" has been inputted instead of the name of the electronic device to be used.

(1) Processing by Device Selection

Figure 11:
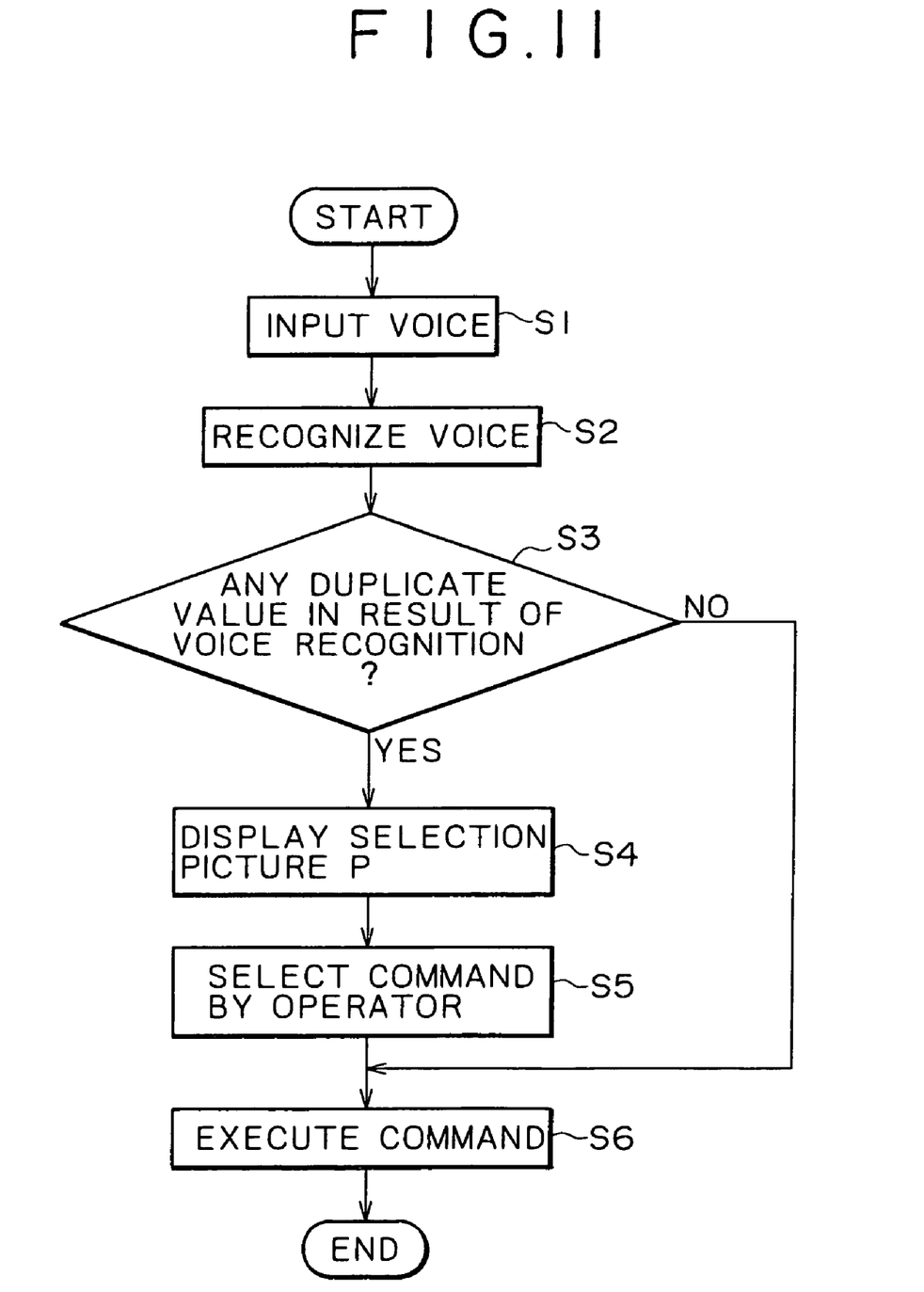
FIG. 11 is a flowchart showing a selection example (manual input) in a selection processing procedure.
Figure 12:
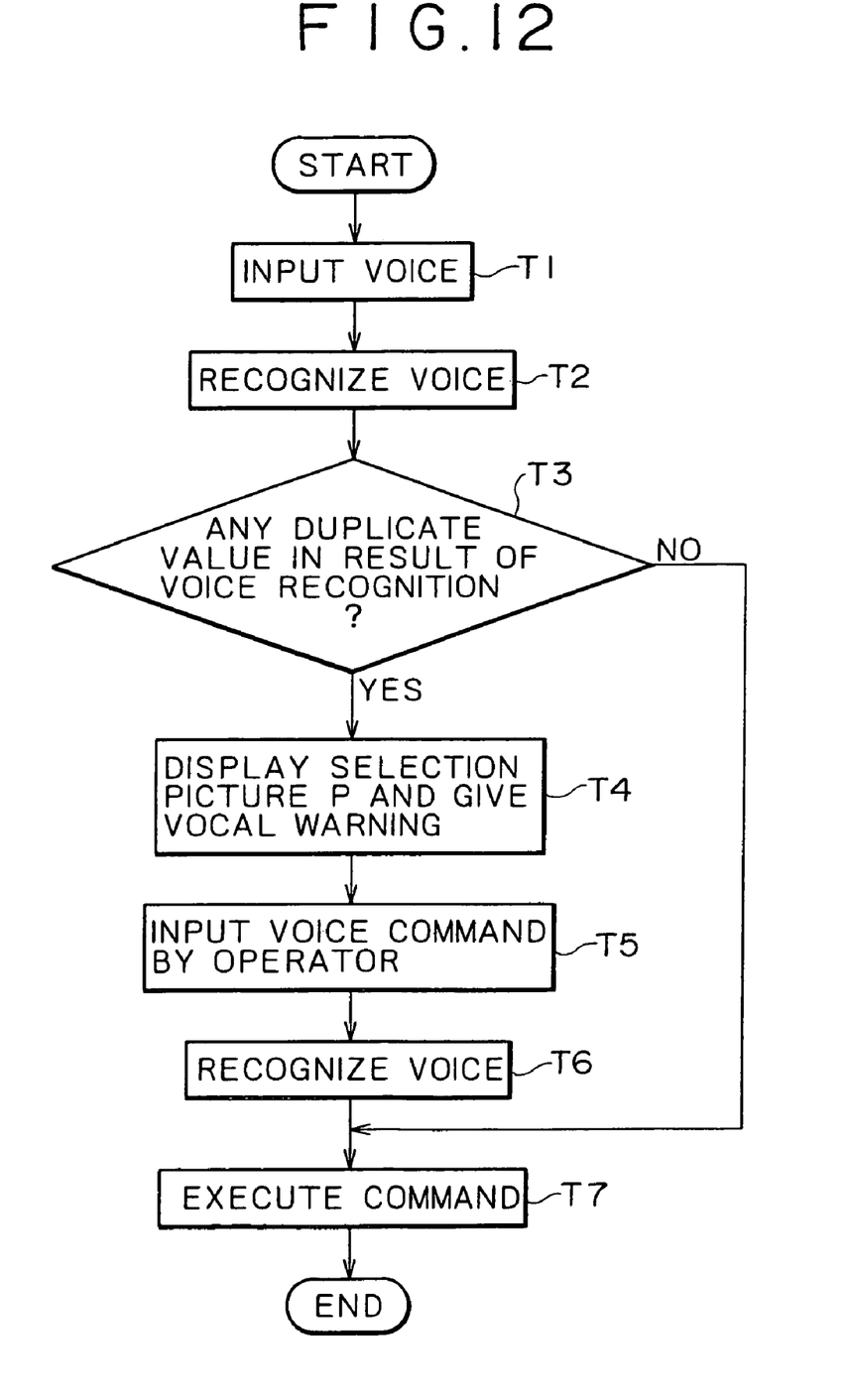
FIG. 12 is a flowchart showing another selection example (voice input) in the selection processing procedure.

FIG. 11 is a flowchart of a selection example (manual input) according to a selection processing procedure in the voice recognition control system 100, and FIG. 12 is a flowchart of another selection processing example (vocal input) according to a selection processing procedure in the control system 100. It is premised here that there are registered, in the voice recognition unit 31, a voice recognition table ITm of the MD player 200, a voice recognition table ITc of the CD player 300 and a voice recognition table ITn of the car navigator 400 (FIG. 10) where a voice command "Play" is set as an expected value.

First, an explanation will be given on device selection by manual input. When the operator utters, for example, "Play" as a voice command at step S1 shown in FIG. 11, "Play" is vocally inputted to the voice input unit 20 (FIG. 10), and then the procedure advances to step S2. Subsequently at step S2, the voice recognition unit 31 performs its voice recognition by comparing the voice digital data Vdd obtained through conversion of the input voice command with each of the registered voice recognition tables ITm, ITc and ITn. Thereafter the procedure advances to step S3.

At step S3, the voice recognition unit 31 detects whether any duplicate expected value is present or not in the voice recognition result (comparison result) relative to the voice digital data Vdd ("Play"). And if there is not any duplicate expected value, the procedure advances to step S6 to perform the "play" operation of the device, such as MD player 200 for example, where the voice command "Play" inputted at step S1 is set as an expected value, and thus the processing routine is completed. Meanwhile, in case any duplicate expected value has been detected at step S3, the procedure advances to step S4, where the selection picture P (FIG. 4) is displayed on the screen 41 (FIG. 10).

Then the procedure advances to step S5, where the operator manipulates the decision button 43 and the cross button 46 out of the commands "CD", "MD" and "Cancel" displayed on the selection picture P, thereby selecting the command "MD" for example. Consequently, the voice recognition table ITm of the MD player 200 corresponding to "MD" and registered in the voice recognition unit 31 is placed in standby so as to be used for subsequent voice recognition. Thereafter the procedure advances to step S6 to perform the "play" operation of the MD player 200 selected at step S5, and thus the processing routine is completed.

Next, an explanation will be given on device selection executed in response to voice input. When the operator utters, for example, "Play" as a voice command at step T1 shown in FIG. 12, "Play" is vocally inputted to the voice input unit 20, and then the procedure advances to step T2. Subsequently at step T2, the voice recognition unit 31 performs its voice recognition by comparing the voice digital data Vdd obtained through conversion of the input voice with each of the registered voice recognition tables ITm, ITc and ITn. Thereafter the procedure advances to step T3.

At step T3, the voice recognition unit 30 detects whether any duplicate expected value is present or not in the voice recognition result relative to the voice digital data Vdd ("Play"). And if there is not any duplicate expected value, the procedure advances to step T7 to execute the voice command, and thus the processing routine is completed. Meanwhile, in case any duplicate expected value has been detected at step T3, the procedure advances to step T4, where the selected picture P is displayed on the screen 41 and simultaneously the operator is notified, through voice synthesis, of the warning displayed on the selection picture P.

Then the procedure advances to step T5, where the operator selectively inputs a voice command "MD" for example out of the commands "CD", "MD" and "Cancel" displayed on the selected picture P, and the procedure advances to step T6 to perform voice recognition in compliance with the input voice command "MD". Thereafter at step T7, the voice recognition table ITm of the MD player 200 corresponding to the voice command "MD" processed at step T6 and registered in the voice recognition unit 31 is placed in standby so as to be used for subsequent voice recognition. And the "play" operation of the MD player 200 is performed in response to the voice command inputted at step T1, and thus the processing routine is completed.

(2) Processing by Reregistration

Figure 13:
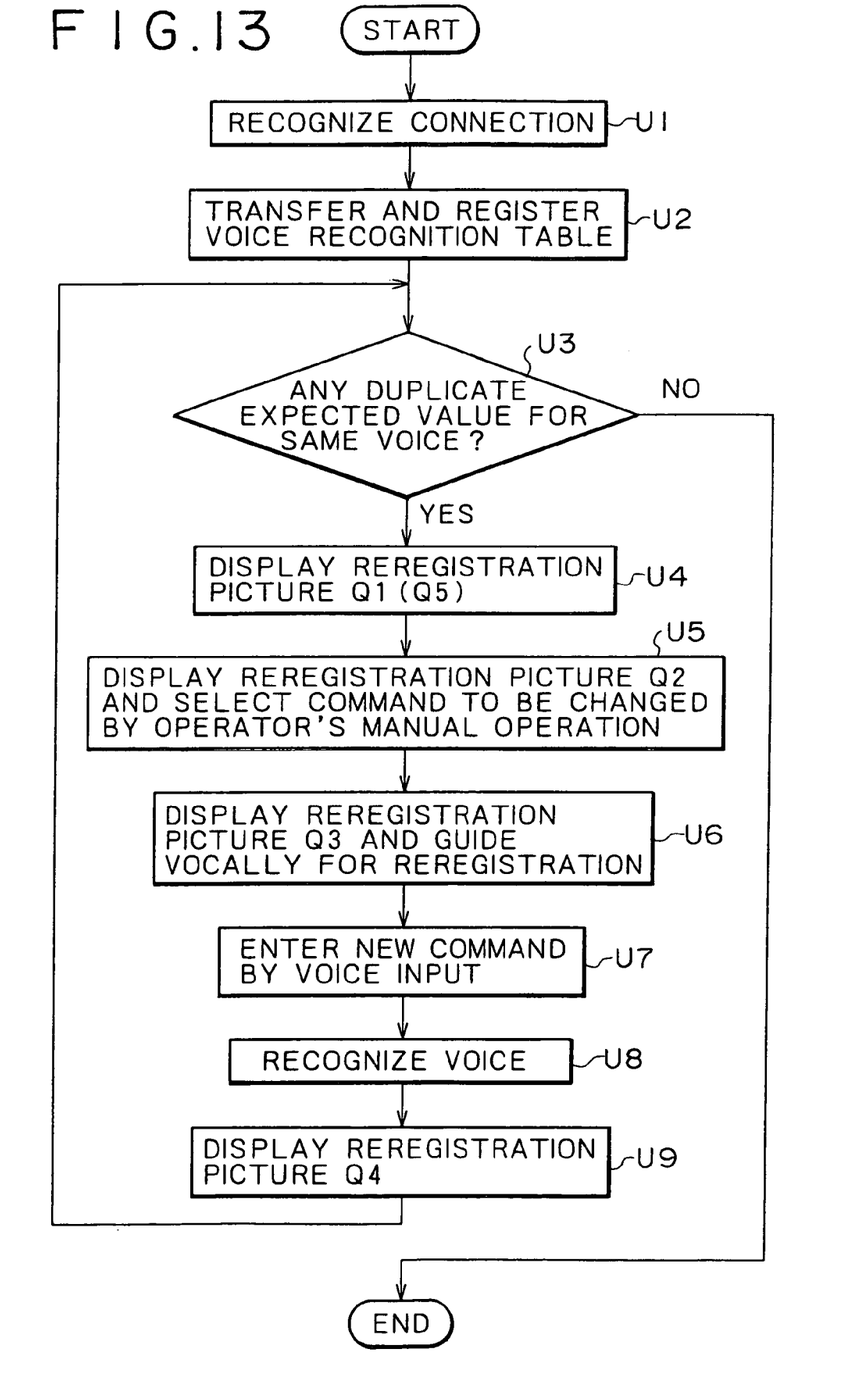
FIG. 13 is a flowchart showing a reregistration example (manual input) in a reregistration processing procedure.
Figure 14:
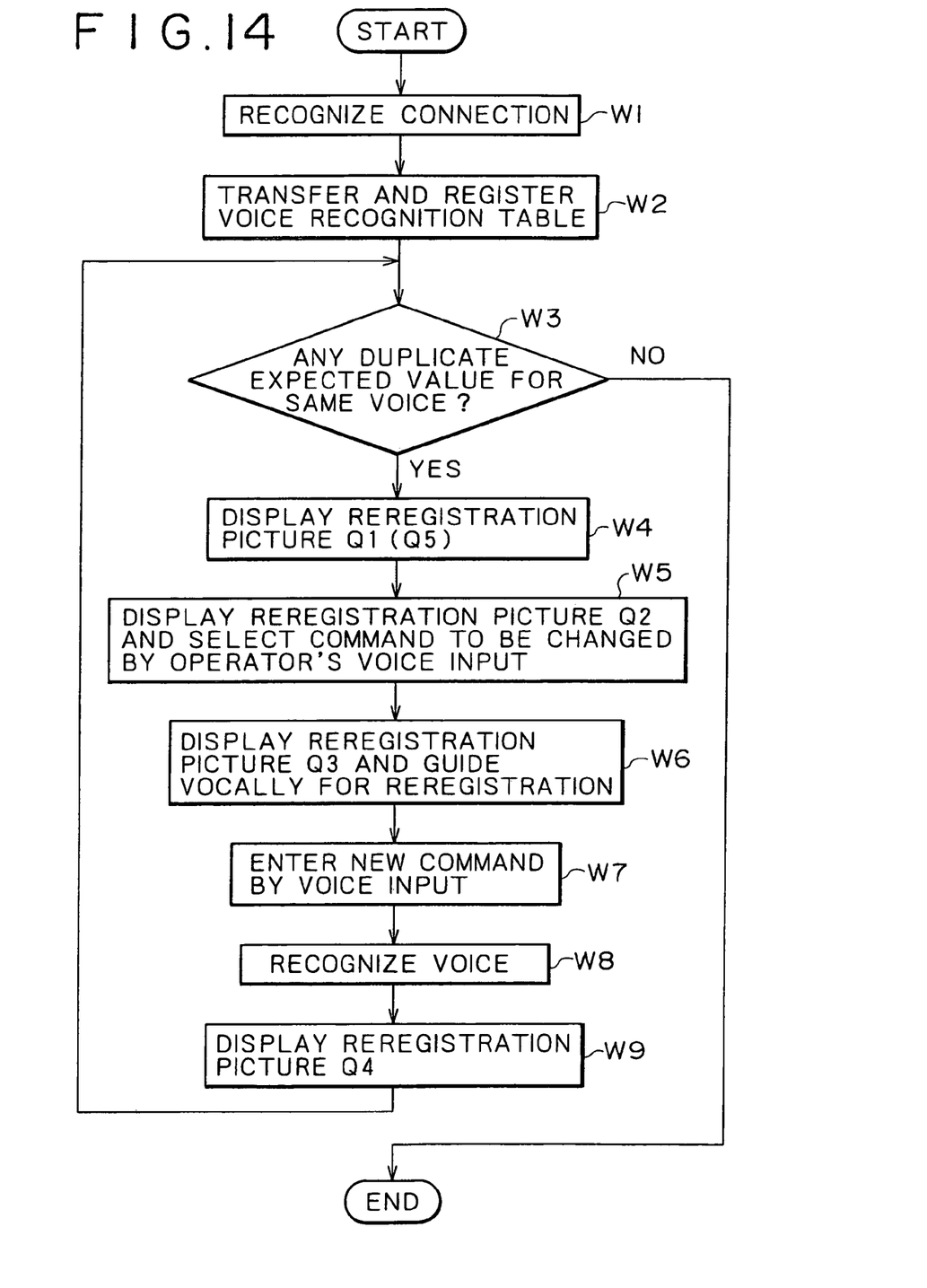
FIG. 14 is a flowchart showing another reregistration example (voice input) in the reregistration processing procedure.

FIG. 13 is a flowchart of a reregistration example (manual input) according to a reregistration processing procedure in the voice recognition control system 100, and FIG. 14 is a flowchart of another reregistration example (voice input) according to a reregistration processing procedure in the control system 100. It is premised here that there are connected, to the IEEE1394 bus 10, the MD player 200 having a voice recognition table ITm, the CD player 300 having a voice recognition table ITc, and the car navigator 400 having a voice recognition table ITn shown respectively in FIG. 10 where a voice command "Play" is set as an expected value.

First, an explanation will be given on reregistration by manual input. When the MD player 200 having a voice recognition table ITm, the CD player 300 having a voice recognition table ITc and the car navigator 400 having a voice recognition table ITn have been connected to the IEEE1394 bus 10, the procedure advances to step U1 shown in FIG. 13. Such connection is recognized at step U1 by the voice recognition unit 31, and then the procedure advances to step U2.

Thereafter at step U2, the MD player 200 transfers the voice recognition table ITm to the voice recognition unit 31. Similarly, the CD player 300 transfers the voice recognition table ITc to the voice recognition unit 31, and the car navigator 400 transfers the voice recognition table ITn thereto. Then the voice recognition unit 31 registers such transferred voice recognition tables ITm, ITc and ITn. At step U3, a detection is made as to whether any duplicate expected value is present or not with regard to the same voice (voice digital data Vdd) in the voice recognition tables ITm, ITc and ITn registered in the voice recognition unit 31. And if there is not any duplicate expected value, the processing routine is completed. Meanwhile, if there is any duplicate expected value at step U3, the procedure advances to step U4, where the reregistration picture Q1 (FIG. 4) is displayed on the screen 41.

At step U4, "See detail" for example displayed as a command on the reregistration picture Q1 is selected by manipulating the decision button 43 and the cross button 46, and then the procedure advances to step U5. Subsequently at step U5, the reregistration picture Q1 is changed to the next reregistration picture Q2 (FIG. 5) where the duplicate word (expected value) is displayed. When the duplicate word "Play" for example is to be changed to another word, the operator manipulates the decision button 43 and the cross button 46 to select "Play", and the procedure advances to step U6.

Then at step U6, the reregistration picture Q2 is changed to the next reregistration picture Q3 (FIG. 6), where a guide for reregistration of the duplicate expected value is displayed, and simultaneously the operator is notified, through voice synthesis, of the guide thus displayed. Thereafter the procedure advances to step U7, where the operator vocally inputs "MD play" for example as a new command. Then the procedure advances to step U8, where the input command "MD play" is vocally recognized, so that "MD play" is newly reregistered in place of "Play".

Subsequently the procedure advances to step U9, where the reregistration picture Q3 is changed to the next reregistration picture Q4 (FIG. 7) which displays completion of the reregistration, and simultaneously the operator is notified, through voice synthesis, of such displayed completion of the reregistration. Thereafter the procedure returns to step U3 again to detect whether there is any duplicate expected value or not. And if the result of this detection signifies that there is not any duplicate expected value, the procedure is completed. Meanwhile, if the result obtained at step U3 signifies that any duplicate expected value is present, the procedure advances to step U4 to display the next reregistration picture Q5 (FIG. 8). In this picture Q5, there are displayed some duplicate expected values not reregistered yet. As new commands are reregistered successively as described for the duplicate expected values, none of the duplicate expected values comes to be detected finally at step U3, whereby the procedure is brought to its end.

Next, an explanation will be given on reregistration by voice input. At step W1 shown in FIG. 14, the connection is recognized in the same manner as at step U1 in FIG. 13. And at step W2, the voice recognition tables ITm, ITc and ITn are transferred and registered in the same manner as at step U2 in FIG. 13. Then a detection is made at step W3 as to whether any duplicate expected value is present or not with regard to the same voice (voice digital data Vdd) in the voice recognition tables ITm, ITc and ITn registered in the voice recognition unit 31. And if the result of this detection signifies that there is not any duplicate expected value, the procedure is brought to an end. Meanwhile, if the result obtained at step W3 signifies that there is any duplicate expected value, the procedure advances to step W4, where the reregistration picture Q1 (FIG. 4) is displayed on the screen 41.

At step W4, "See detail" displayed on the reregistration picture Q1 is vocally inputted as a voice command. And then the procedure advances to step W5, where the reregistration picture Q1 is changed to the next reregistration picture Q2 (FIG. 5) in which the duplicate word (expected value) is displayed. When the duplicate word "Play" for example is to be changed to another word, the operator vocally inputs a voice command "Play", which is thereby processed through voice recognition, and "Play" is selected as the word to be changed.

Then at step W6, the reregistration picture Q2 is changed to the next reregistration picture Q3 (FIG. 6), where a guide for reregistration of the duplicate expected value is displayed, and simultaneously the operator is notified, through voice synthesis, of the guide thus displayed. Thereafter the procedure advances to step W7, where the operator vocally inputs "MD play" for example as a new command. Then the procedure advances to step W8, where the input command "MD play" is vocally recognized, so that "MD play" is newly reregistered in place of "Play".

Subsequently the procedure advances to step W9, where the reregistration picture Q3 is changed to the next reregistration picture Q4 (FIG. 7) which displays completion of the reregistration, and simultaneously the operator is notified, through voice synthesis, of such displayed completion of the reregistration. Thereafter the procedure returns to step W3 again to detect whether there is any duplicate expected value or not. And if the result of this detection signifies that there is not any duplicate expected value, the processing routine is completed. Meanwhile, if the result obtained at step W3 signifies that any duplicate expected value is present, the procedure advances to step W4 to display the next reregistration picture Q5 (FIG. 8). In this picture Q5, there are displayed some duplicate expected values not reregistered yet. Since new commands are reregistered successively as described for the duplicate expected values, finally none of the duplicate expected values comes to be detected at step W3, whereby the procedure is brought to its end.

Consequently, even if non-recognition of the voice is caused due to the presence of any duplicate expected value, this occurrence is solvable with facility by selection of the device, and the voice recognition accuracy can be enhanced by reregistration of the expected value.

Thus, according to the voice recognition control system 100 and the voice recognition control method described as preferred embodiments of the present invention, when the MD player 200 having a voice recognition table ITm has been connected to the IEEE1394 bus 10, the controller 32 recognizes such connection of the MD player 200, and then the voice recognition unit 31 registers the voice recognition table ITm transferred thereto. Subsequently the voice input unit 20 converts the input operator's voice command into voice digital data Vdd. Thereafter the voice recognition unit 31 compares the voice digital data Vdd with the expected value in the registered voice recognition table ITm to thereby execute voice recognition, and further converts the digital data Vdd into voice text data TDm by use of the voice recognition table ITm. And the controller 32 transfers, to the MD player 200, a control command COm which serves to execute the operation complying with the voice command on the basis of the voice text data TDm, hence operating, by the voice command, even the unregistered MD player 200 having the voice recognition table ITm.

Even in case the unregistered CD player 300 and car navigator 400 have additionally been connected to the IEEE1394 bus 10 to which the MD player 200 is connected previously, the voice recognition unit 31 registers the voice recognition tables ITc and ITn to thereby perform the operation of the MD player 200, the CD player 300 and the car navigator 400 in response to the voice command.

Therefore, it becomes possible to operate, through voice recognition, the entire electronic devices adapted for voice recognition. In addition, preparing for occurrence of voice non-recognition due to the presence of some duplicate expected value relative to the voice command, this invention is furnished with a selection processing procedure for guiding the operator to deal with such voice non-recognition by selecting the device to be used either manually or by voice input, and also with a reregistration processing procedure for guiding the operator to detect such duplication at the time of connection of the device and to register a new word in place of the duplicate expected value, hence enhancing both the accuracy and operability in voice recognition and further enabling the operator to customize the voice recognition control system by himself.

In the voice recognition control system of the present invention, as described hereinabove, a voice input means is provided to compare an input operator's voice with a voice recognition table registered upon connection of an electronic device, and a control means is provided to control the input/output of the electronic device in accordance with the result of such comparison.

According to this structure, even when any voice-recognizable unregistered electronic device has been connected, it is possible to operate the electronic device through recognition of the voice.

In the voice recognition control method of the present invention, there are executed the steps of supplying, to each electronic device, a voice recognition table where an operator's voice is stored in advance as an expected value, then registering the voice recognition table of the electronic device in a control section when any unregistered electronic device supplied with the voice recognition table has been connected to a bus, subsequently, upon recognition of the operator's voice, comparing the operator's voice with the voice recognition table of the electronic device registered in the control section, and controlling the input/output of the electronic device in accordance with the result of comparing the operator's voice with the voice recognition table.

Therefore, voice recognition can be applied to the entirety of voice-recognizable electronic devices.

The present invention is exactly adapted for use in a voice recognition control system or the like which performs control of automobile electronic devices by voice input.

What is claimed is:

1. A voice recognition control system for controlling input/output of a preregistered first electronic device having a prerecorded first voice recognition table where an operator's voice is stored in advance as an expected value, the system comprising:
a voice input means for receiving the operator's voice; and
a control means for:
controlling the input/output of the first electronic device through recognition of the operator's voice;
comparing the operator's voice with the first voice recognition table of the first electronic device;
controlling the input/output of the first electronic device in accordance with the result of comparing the operator's voice with the first voice recognition table;
receiving a permission request initiated by an unregistered second electronic device, the request requesting permission to transfer a second voice recognition table to the control means;
responding affirmatively to the permission request;
receiving the second voice recognition table from the second electronic device;
registering the received second voice recognition table.

2. A voice recognition control system according to claim 1, wherein the control means comprises:
a voice recognition unit configured to:
register the second voice recognition table, and
recognize the operator's voice through comparison of the second voice recognition table with the voice inputted by the input means; and
a controller configured to control the input/output of the second electronic device in accordance with the result of the comparison executed by the voice recognition unit.

3. A voice recognition control system according to claim 2, wherein the voice recognition unit is further configured to:

recognize the operator's voice by comparing the second voice recognition table with the input operator's voice, when the operator's voice is coincident with the expected value in the second voice recognition table, convert the operator's voice into voice text data by the use of the second voice recognition table, and transfer the voice text data to the controller.

4. A voice recognition control system according to claim 3, wherein, when the operator's voice received by the voice input means is recognized to indicate operation of the second electronic device, the controller controls the input/output of the second electronic device in accordance with the voice text data transferred from the voice recognition unit that indicates the operation of the second electronic device.

5. A voice recognition control system according to claim 3, wherein, when the operator's voice received by the voice input means is recognized to indicate a predetermined name of the second electronic device, the controller receives the voice text data transferred from the voice recognition unit that indicates the name of the second electronic device, and instructs the voice recognition unit to use the second voice recognition table for execution of subsequent voice recognition.

6. A voice recognition control system according to claim 3, wherein the voice input means, voice recognition unit and controller are connected mutually via a communication line, and the operator's voice received by the voice input means and the voice text data are both transmitted to the communication line.

7. A voice recognition control method employed in a voice recognition control system for recognizing an operator's voice and controlling inputs/outputs of various electronic devices from a control section, the method comprising:

supplying, to each of the electronic devices, a voice recognition table where the operator's voice is stored in advance as an expected value;

registering a first voice recognition table of a first electronic device in the control section when an unregistered second electronic device having a second voice recognition table has been connected to the control section;

comparing, upon input of the operator's voice, the operator's voice with the first voice recognition table of the first electronic device registered in the control section; and controlling the input/output of the first electronic device in accordance with the result of comparing the operator's voice with the first voice recognition table;

receiving a permission request initiated by the second electronic device, the request requesting permission to transfer the second voice recognition table to the control section;

responding affirmatively to the permission request;

receiving the second voice recognition table from the second electronic device;

registering the received second voice recognition table.

8. A voice recognition control method according to claim 7, further comprising:

detecting, upon recognition of the operator's voice, whether duplicate expected values are present or not with regard to the same voice in a plurality of the voice recognition tables registered in the control section, and upon detection of the duplicate expected values, notifying the operator of such detection of the duplicate expected values, and further notifying the operator of a selection procedure for processing the duplication of the expected values.

9. A voice recognition control method according to claim 8, wherein the selection procedure is displayed as a guide for enabling the operator to select a predetermined one of the duplicate expected values.

10. A voice recognition control method according to claim 7, further comprising:

detecting, upon registration of the voice recognition tables of the electronic devices connected to the control section, whether duplicate expected values are present or not with regard to the same voice in the voice recognition tables registered in the control section, and upon detection of the duplicate expected values, notifying the operator of such detection of the duplicate expected values, and further notifying the operator of a reregistration procedure for processing the duplication of the expected values.

11. A voice recognition control method according to claim 10, wherein the reregistration procedure is displayed as a guide for enabling the operator to register the duplicate expected value as another voice.

* * * * *

UNITED STATES PATENT AND TRADEMARK OFFICE
CERTIFICATE OF CORRECTION

| | | |
|---|---|---|
| PATENT NO. | : 7,801,730 B1 | Page 1 of 1 |
| APPLICATION NO. | : 09/626309 | |
| DATED | : September 21, 2010 | |
| INVENTOR(S) | : Yoshio Miyazaki et al. | |

It is certified that error appears in the above-identified patent and that said Letters Patent is hereby corrected as shown below:

On the Title Page, Item (75), in the Inventors, line 2, "Kanagwa" should read --Kanagawa--.

Signed and Sealed this

Sixteenth Day of November, 2010

David J. Kappos
*Director of the United States Patent and Trademark Office*